United States Patent [19]

Clayton

[11] 4,297,847
[45] Nov. 3, 1981

[54] CONVERSION OF GEOTHERMAL ENERGY FROM SUBTERRANEAN CAVITIES

[75] Inventor: Carl C. Clayton, Corpus Christi, Tex.

[73] Assignee: PPG Industries, Inc., Pittsburgh, Pa.

[21] Appl. No.: 71,337

[22] Filed: Aug. 30, 1979

[51] Int. Cl.³ ............................................... F03G 7/00
[52] U.S. Cl. .................................. 60/641.3; 60/641.2; 165/45
[58] Field of Search ................. 60/641, 641 C, 641 D; 165/45

[56] References Cited

U.S. PATENT DOCUMENTS

| | | | |
|---|---|---|---|
| 3,470,943 | 10/1969 | Van Huisen | 60/641 |
| 3,676,078 | 7/1972 | Jacoby | 60/641 X |
| 4,060,988 | 12/1977 | Arnold | 165/45 X |
| 4,074,754 | 2/1978 | Christian | 166/245 |
| 4,124,805 | 11/1978 | Jacoby | 60/641 X |
| 4,189,923 | 2/1980 | Berg | 60/641 |

OTHER PUBLICATIONS

Chemical & Engineering News 55(7); p. 22, Feb. 14, 1977, ISSN 0009-2347.
The Oil & Gas Journal 77(13); pp. 164–165, Mar. 26, 1979, ISSN 0030-1388.

Primary Examiner—Allen M. Ostrager
Assistant Examiner—Stephen F. Husar
Attorney, Agent, or Firm—Irwin M. Stein; Walter M. Benjamin

[57] ABSTRACT

Geothermal energy is recovered by (1) introducing into a subterranean heat exchange medium which is in heat exchange with a high temperature formation a liquified vapor which will vaporize at the conditions of the medium; (2) vaporizing the liquified vapor; (3) confining the liquified vapor until pressurized; and (4) recovering pressurized vapor having thermal and pressure-volume energy converted from the high temperature formation.

12 Claims, 1 Drawing Figure

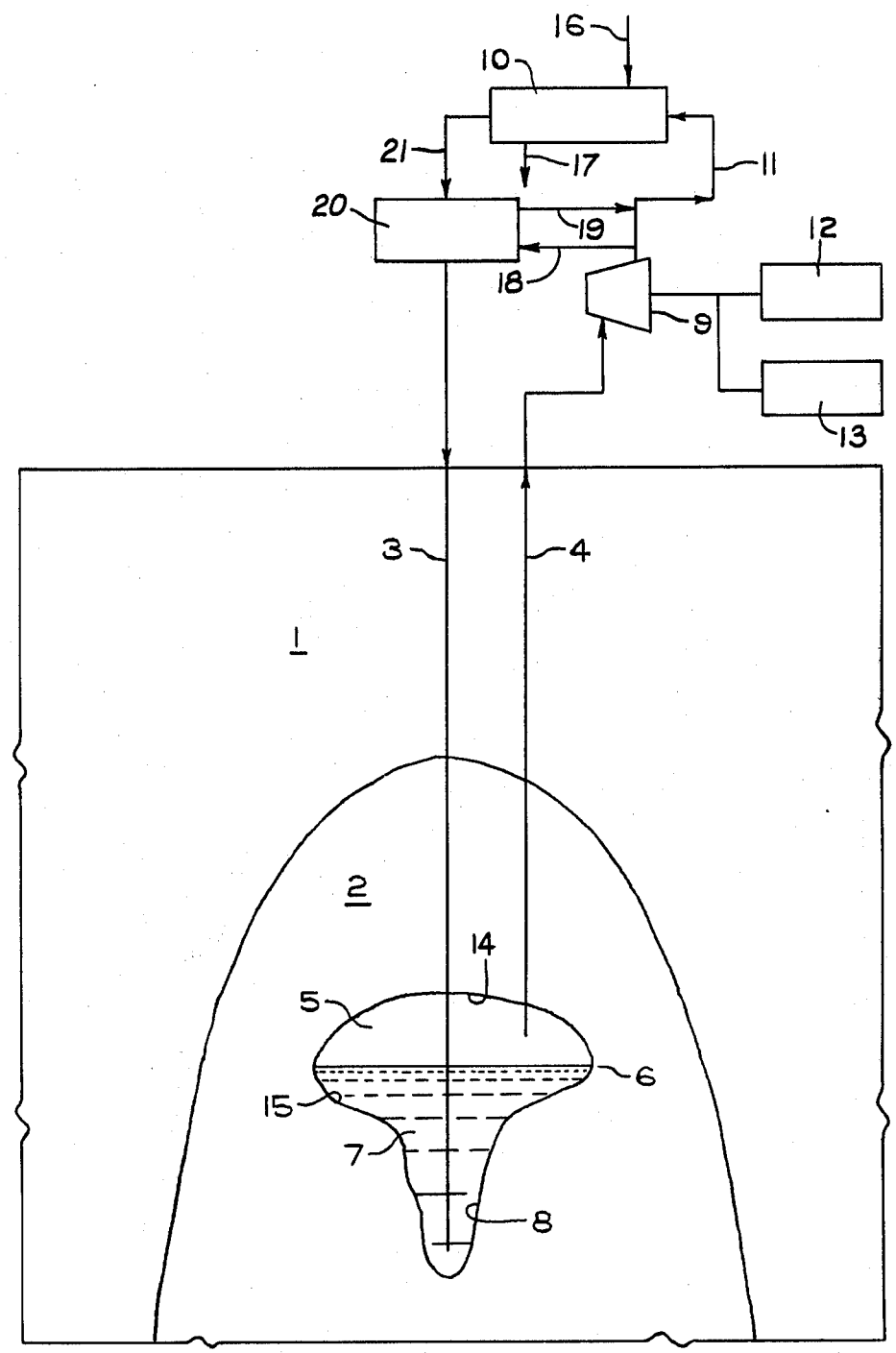

CONVERSION OF GEOTHERMAL ENERGY FROM SUBTERRANEAN CAVITIES

BACKGROUND OF THE INVENTION

This invention relates to a method of converting geothermal energy from subterranean deposits and more particularly relates to converting geothermal energy from subterranean salt domes.

After using fossil fuels for thousands of years, mankind has found that reservoirs of this source of energy are rapidly approaching depletion. Hence, alternate sources of energy are earnestly being sought. Among these are "inexhaustible energy sources" which include fusion, solar, breeder-fusion and geothermal energy. In comparison to the other sources, geothermal energy appears to be the most accessible source having lesser technical barriers to overcome to make its use practical.

The most formidable technical problem confronting producing geothermal energy is that high temperature geological formations are so deep that they are economically and practically inaccessible. Even if these formations were accessible by drilling or otherwise, the cost of pumping fluids into these formations for heat exchange can be astronomical in comparison with tolerable energy costs.

SUMMARY OF THE INVENTION

It has been found that geothermal energy can be practically utilized by introducing into a subterranean high temperature formation, a liquid which will evaporate at the conditions of the formation, recovering the gas at the surface and converting the pressure-volume energy of the gas to other forms of energy. The latent heat of condensation of the gas can also be utilized on the surface before the condensate is re-introduced into the formation for further recovering geothermal energy.

While the liquid can be introduced into practically any accessible high temperature formation, it is preferred that the liquid be introduced into a subterranean salt dome or the like wherein a drill easily penetrates, a cavity can be easily created and wherein the cavity brine solution can provide an effective heat exchange medium for an immiscible liquid working fluid. Additionally, a salt cavity can be effectively sealed to liquid and gas. Pressure developed from the gas resulting from the vaporized immiscible liquid can be an aid in preventing cavity roof collapse.

Gas recovered at the surface can be converted to various forms of energy, but it is preferred that its pressure-volume energy is converted to the mechanical energy of a turbine which in turn drives pumps, compressors and the like or produces electrical power. Thereafter, the condensed immiscible liquid can be returned to the salt deposit. The power generated can supplement the power required to run a brine field which supplies brine for other purposes, such as brine for electrolytic cells for producing caustic soda and chlorine.

BRIEF DESCRIPTION OF THE DRAWINGS

Further advantages and benefits will become apparent from the detailed description of the invention made below with reference to the drawing in which a diagrammatical illustration of a solution mine cavity being used to convert geothermal energy is shown.

DETAILED DESCRIPTION OF THE INVENTION

According to the present invention, geothermal energy is converted to another form of energy at the earth's surface by introducing into a heat exchange medium, such as a cavity in heat exchange with a high temperature formation, a liquid which will evaporate, recovering the gas at the surface and converting the pressure-volume energy of the gas to other forms of energy. Any geothermal formation can be utilized as a source of heat so long as (1) a cavity can be created in the formation, (2) adequate heat transfer can be obtained across the cavity walls, (3) the cavity does not collapse under the working conditions of the invention and (4) the cavity is capable of confining high gas pressures without substantial leakage. Accordingly, a salt dome or the like, as well as other formations can satisfy the aforestated conditions.

A salt dome which communicates with a very deep high temperature geologic structure, such as a salt bed, is especially suited for the present invention. Since salt is highly heat conducting, the high temperature geologic structure can be an essentially inexhaustible heat source and an ideal cavity can be created in a salt deposit. Hence, the preferred embodiment of the present invention will be described with reference to a cavity in a salt dome.

A cavity is created in the salt dome by methods well known in the art of solution mining. Preferably the cavity is made with two thermally insulated conduits communicating with the surface. This can be accomplished by drilling two spaced boreholes into the salt deposit and connecting the boreholes by mining cavities laterally, fracturing or other methods of the art. It is less preferred that the two conduits are disposed concentrically or in parallel into one borehole. However, some degree of insulation is obtainable in this latter case.

The depth at which the cavity is to be established is determined from economics and the temperature of the dome at various depths. It can be noted that once underlying rock formations are penetrated by the well bore(s) and the salt deposit is reached, drilling is relatively easy and great depths can be reached. Hotter cavities at greater depths need not be as large as cooler cavities at a lesser depth to produce the same amount of thermal energy. Hence, it may be desirable to establish the cavity as deep as practical with existing drilling technology, e.g., about 3,000 meters.

The shape of the cavity is important from the standpoint of heat exchange wall area and from the standpoint of stability against cave-in. While the cavity may be pressurized according to the present invention, the pressure may not be great enough to support the roof of the cavity. Hence, a domed shaped cavity is preferred to minimize the pressure necessary to support the roof. The area of the cavity walls will be determined in view of the specific heat of the salt formation, the specific heat of the cavity solution and the temperature difference between the salt formation and the cavity solution such that enough heat transfer occurs to produce the desired amount of energy at surface. Several cavities may be necessary to supply the requisite amount of heat. A cluster of cavities communicating with a single station on the surface as taught by U.S. Pat. No. 3,339,979 may be possible, so long as there is immaterial interference or distortion of the directionality of heat flows into adjacent cavities.

A solution saturated with respect to the salt (i.e., little if any dissolving of the cavity walls occurs) is maintained in the cavity with a vapor space provided above the solution level in the cavity. It is also preferred that changes in cavity solution temperature do not cause dissolving since a growth migration can cause the cavity to lose the integrity of its stability and result in roof collapse. The vapor space is large enough so that cavity solution that may become entrained in gas escaping the solution surface will not be carried up to the earth surface along with the power fluid. About one-fifth the cavity volume, for example, would be a sufficient vapor space. Alternatively, a relatively large cavity can be developed on the withdrawal conduit and several hundred feet above the cavity in which the power fluid would be evaporated. This cavity can also serve as an entrainment separator as does the vapor space in the former embodiment.

An immiscible liquid (power liquid), such as propane or butane, which is vaporizable at cavity conditions is introduced into near the bottom of the cavity. It is preferred that the power fluid is essentially immiscible with the cavity solution and have a high enough vapor pressure to aid in maintaining the cavity against roof collapse. Propane is desirable because it is relatively inexpensive, has a vapor pressure of 34-40 atmospheres at a temperature range around 120° C., has a critical temperature of 97° C. and is expected to produce a dry superheated vapor around 120° C. Other immiscible power fluids such as butane and other hydrocarbons can be used. It is also preferred that a vaporized power fluid is condensable at atmospheric temperature so that air or water cooling can condense the vapor.

By introducing the power fluid at near the bottom of the cavity, the action of vaporizing the power fluid creates turbulence in the brine which aids in heat transfer from the salt through the brine to the propane. Liquid propane is broken up into small enough droplets to provide a large contact surface area and thus provide a liquid hold-up which does not allow liquid propane to accumulate on the surface of the solution. In a preferred embodiment, the cavity is very long and narrow at its bottom section to provide a long heat exchange surface. This type arrangement is possible where an accumulation of insolubles at the bottom of the cavity do not tend to restrict circulation. A large diameter cavity may be even more preferred, depending upon the temperature, heat flux, heat transfer coefficient, and thermal gradient, all of which may be ascertained or closely estimated by those skilled in the art.

The vaporized power fluid is separated from entrained cavity solution as it passes through the vapor space. The pressure of the vapor is allowed to develop to near the formation pressure such as by confining the vapor to a high pressure, e.g., about 37 atmospheres. This pressure is an adequate inlet pressure for a turboexpander used above the earth surface to convert the pressure-volume energy of the vaporized power fluid into mechanical energy, which can be converted to electrical energy.

The pressurized vapor enters a turboexpander above the earth surface and exits the turboexpander at lower pressure. The use of these turboexpanders to convert pressure-volume energy isentropically as well known in the art. The low pressure exit gas is condensed under pressure such as by a cooling tower using air or water as the coolant and the pressurized condensate is returned to the cavity to complete the cycle.

The condensate entering the cavity can be placed in heat exchange with exit gas from the turboexpander, to preheat liquid injected into the cavity well and/or also pre-cool gas to be condensed. If low level waste steam is available, it can be utilized to heat the vapor as it emerges from the ground and will produce a higher initial heat content. This waste heat can also be used to preheat liquid power fluid injected into the cavity. Neither of these uses of the steam has any value unless the steam has no other use. It only serves to increase the output of the turboexpander.

Separate conduits can be placed in communication with the cavity solution to control the solution level, to further enlarge the cavity or make other adjustments in the cavity solution. Particularly, where the evaporator section of the cavity has been changed through the effect of changing temperatures or erosion and/or pressure, fresh water or brine can be injected into the bottom of the cavity to enlarge the cavity. It is known that water, having a lower density than brine, will rise through the brine, but the turbulence occurring at the bottom of the cavity will cause the water to dissolve additional salt at the bottom of the cavity owing to the agitation effect.

Reference is now made to the drawing which illustrates an embodiment of the present indication. A well bore is drilled through overburden 1 into salt dome 2 to a depth of about 3,120 meters. The well bore is cased to a depth of about 3,000 meters. A tubing is run down to near the bottom of the well bore and a solvent for the salt is introduced therethrough. An enriched solution is withdrawn through the annular space between the tubing and the casing. A cylindrical cavity is mined to about 20 meters radius and extending from the bottom of the well bore to the casing.

A second well bore is drilled about 50 meters from the first well bore and to a depth of about 3,020 meters. With a roof insulating blanket in place, cavities are created in each well bore at a depth of about 3,020 meters and grown upwardly and laterally by methods known in the art until the cavities connect at a depth of about 3,010 meters. The cavity is then grown from both well bores to create a dome-like roof 14, such as by the method taught by U.S. Pat. No. 2,787,455.

Conduit 3 is run down to near the bottom of the first well bore and conduit 4 is run down to a depth of about 3,005 meters. Solution is withdrawn from the cavity until it reaches level 6 at about 3,015 meter depth. The remainder solution is allowed to set and become saturated with respect to the salt while the cavity vapor space may be pressurized with propane, natural gas or some other oxygen-free gas to support the roof.

The above earth surface equipment is connected to the conduits communicating with the cavity. This equipment includes turboexpander 9, compressor or pump 13 or electric generator 12, and condenser 10 with coolant inlet 16 and outlet 17. Other equipment necessary to carryout the present invention is only a matter of expedience by an artisian, e.g., valves, pumps, control equipment, etc.

Propane is pumped down conduit 3 into solution 7 and vaporizes in the lower section 8 of cavity 15. The vapor pressure in vapor space 5 begins to build until it reaches about 40.8 atmospheres absolute and a temperature of about 110° C. The vaporized propane exits the earth surface through conduit 4 at about 40 atmospheres absolute (part of the pressure is utilized to mobilize the vapor to the surface) and about 104° C., having a heat content of about 73,700 joules per kilogram at which condition the vaporized propane enters turboexpander 9. The turboexpander, having an efficiency of about 70 percent expands this propane isentropically to an exhaust condition of about 12 atmospheres and about 40° C., and having about 64,609 joules per kilogram. Hence, about 9090 joules per kilogram are utilized from the propane at 70 percent efficiency. This results in about 123 kilograms of propane per kilowatt hour energy produced by generator 12. The expanded propane is forwarded by line 11 to condenser 10 where it is condensed. The condensate is forwarded by line 21 to heat exchanger 20 where it can be placed in heat exchange with exit gas from turboexpander 9 by means of inlet line 18 and outlet line 19.

For a cavity having a cylindrical lower portion which is 40 meters in diameter and 100 meters deep, about 12,500 square meters wall area is available for heat exchange. By maintaining the temperature difference across this surface at about 28° C., it is expected that the rate of heat flow is about $3.8 \times 10^9$ joules per hour, based on somewhat idealized assumptions, which is converted to about 750 kilowatt-hours at generator 12. Hence, about 92,000 kilograms per hour propane must be circulated through the system.

It can be seen from the above that geothermal energy can be converted to energy at the earth surface. Advantage is taken of a vaporized gas developing pressure thereby forcing itself to the surface of the earth resulting in a savings of pumping costs. Also, its latent heat of condensation can be expediently utilized. Hence, many modifications of the present invention will become obvious to those skilled in the art. For example, old abandoned cavities may also be used for this purpose. Even though the diameter may be quite large and a significant amount of vapor passing up through the brine would make increased circulation necessary within the cavity, it could still provide a large heat source without the expense of having to drill new cavities. Therefore, the described embodiment should not be considered limitations except insofar as those limitations are cited in the claims.

What is claimed is:

1. A method of recovering geothermal energy, which comprises:
   a. introducing immiscible liquid hydrocarbon working fluid below the surface of a brine solution maintained in a subterranean cavity produced by the solution mining of salt within a salt dome that is in heat exchange relationship with a geothermal formation, said hydrocarbon working fluid being vaporizable at the temperature of the brine solution;
   b. collecting vaporized working fluid in a vapor space that is directly above the brine solution and within the subterranean cavity until the working fluid vapor develops pressure sufficient to mobilize vaporized working fluid to the earth's surface, said vapor space being sufficiently large to separate brine solution entrained in vaporized working fluid as the vaporized fluid passes through the vapor space;
   c. removing pressurized working fluid vapor from the cavity to the earth's surface; and
   d. converting the pressure-volume energy of the pressurized working fluid vapor to another form of energy by isentropic expansion of the working fluid vapor.

2. The method of claim 1 wherein the solution mined cavity is dome shaped.

3. The method of claim 1 wherein the vapor space is about one-fifth of the cavity volume.

4. The method of claim 1 wherein the immiscible liquid hydrocarbon working fluid is selected from the group consisting of propane and butane.

5. The method of claim 1 or 4 wherein at least a portion of the pressure-volume energy is converted to electrical energy by expanding the pressurized vapor in a turboexpander which powers an electrical generator.

6. The method of claim 1 or 4 wherein at least a portion of the pressure-volume energy is converted to mechanical energy by expanding the pressurized vapor in a turboexpander which powers a compressor or pump.

7. The method of claim 1 or 4 wherein the immiscible liquid hydrocarbon is introduced into the brine solution near the bottom of the cavity.

8. The method of claim 1 or 4 wherein the pressure of the vaporized working fluid collected in the vapor space of the cavity is about the pressure of the geologic formation.

9. The method of claim 1 or 4 wherein the expanded working fluid vapor is liquified and recycled to the subterranean cavity.

10. The method of claim 9 wherein the liquified working fluid is placed in heat exchange relationship with the expanded working fluid vapor.

11. The method of claim 7 wherein the brine solution is saturated with respect to salt.

12. The method of claim 7 wherein the immiscible liquid hydrocarbon is introduced as droplets into the brine solution.

* * * * *